United States Patent [19]

Shifrin

[11] Patent Number: 5,521,233

[45] Date of Patent: May 28, 1996

[54] BIODEGRADABLE AIR DRYING SCREEN PRINTING INK

[76] Inventor: Shari Shifrin, 560-2 Pine Island Rd., North Fort Myers, Fla. 33903

[21] Appl. No.: 386,109

[22] Filed: Feb. 9, 1995

[51] Int. Cl.$^6$ ................ C08L 5/04; C08K 5/15; C08K 5/00; C09B 61/00
[52] U.S. Cl. ................ 524/28; 524/56; 523/124; 523/128; 523/160; 106/24 R; 106/24 A; 106/24 B; 106/25 A; 106/25 R; 106/27 R; 106/30 R; 106/20 R; 8/646
[58] Field of Search ........ 524/56, 28; 523/124, 523/128, 160; 106/24 R, 24 A, 24 B, 25 A, 25 R, 27 R, 30 R, 20 R; 8/646

[56] References Cited

U.S. PATENT DOCUMENTS

| | | | |
|---|---|---|---|
| 437,781 | 10/1890 | Higgins | 106/22 E |
| 2,300,880 | 11/1942 | Erickson et al. | 260/32 |
| 3,244,558 | 4/1966 | Chan | 117/38 |
| 3,825,431 | 7/1974 | Uhl et al. | 106/20 |
| 3,996,179 | 12/1976 | Haus et al. | 106/22 |
| 4,699,664 | 10/1987 | Hettiarachchy et al. | 106/288 |
| 4,936,916 | 6/1990 | Shinmitsu et al. | 106/21 |
| 5,114,479 | 5/1992 | Keaveney et al. | 106/30 |

FOREIGN PATENT DOCUMENTS

| | | | |
|---|---|---|---|
| 2167349 | 7/1987 | Japan | 106/22 |
| 0700576 | 11/1979 | U.S.S.R. | 106/22 |
| 558087 | 12/1943 | United Kingdom | 106/30 R |

*Primary Examiner*—Paul R. Michl
*Assistant Examiner*—LaVonda R. DeWitt
*Attorney, Agent, or Firm*—Merrill N. Johnson

[57] ABSTRACT

A biodegradable air drying screen printing ink. The ink includes a base made of water and a colloidal gum, preferably sodium alginate. A naturally-occurring binder is added to the base, preferably natural latex. The ink also includes one or more pigments made from natural ingredients, preferably plants or insects.

2 Claims, No Drawings

BIODEGRADABLE AIR DRYING SCREEN PRINTING INK

FIELD OF INVENTION

My invention lies in improvements in the art of screen printing designs and text onto fabrics. In particular, my invention is an improved screen printing ink whose use creates no enviromental problems and reduces the manufacturing cost of screen printed fabrics.

BACKGROUND OF THE INVENTION

Historically and presently, almost all screen printing is done with plastisol, a complex mixture of vinyl resin, a plasticizer and one or more pigments. Fusion or "setting" of freshly printed plastisol into a dried film requires exposure of the screen printed fabric to temperatures exceeding 300° F. This increases the cost of the screen printed product and consumes precious energy.

Moreover, dried plastisols are not biodegradable and some of the components used in conventional screen printing are hazardous. Screen printing generates waste it which often contains hazardous materials, creating disposal problems.

The screen printing industry, seeking ways to reduce printing costs and faced with governmental regulations aimed at conserving energy and reducing environmental pollution, has been investigating alternative methods and materials to reduce or eliminate the foregoing problems. See "Industry Dyeing to be 'Green'" on pp. 24– 25, *Imprinting Business* issue of August 1993, and Environmental Protection Agency hazardous waste circular "Printing and Allied Industries" published Apr. 15, 1990.

SUMMARY OF THE INVENTION

This invention is a biodegradable screen printing ink that is free of plastisol and other hazardous materials and can be air dried or "set" at room temperatures. Thus its manufacture, use and disposal avoids environmental contamination and saves thermal energy. It consists essentially of water and naturally occurring colloidal polysaccharides to which are added binders and one or more pigments obtained from renewable plants and insects. These inks are biodegradable, environmentally non-polluting in manufacture and disposal, safe to use, and colorfast.

DETAILED DESCRIPTION OF THE INVENTION

The biodegradable and air-dryable inks of this invention comprise a base of one or more colloidal polysaccharides or other soluble gums, preferably sodium alginate, dissolved in water to form a viscous colloidal solution. A disbursing agent such as coconut oil is preferably added to obtain rapid dissolution. The base is a clear and colorless liquid. A typical base by volume comprises 99.5% water, 0.37% sodium alginate, and 0.09% coconut oil. The base should be stored in air tight containers to prevent contamination, molding or premature curing. One teaspoon of clove oil per liter of stored base will act as a preservative.

A naturally-occurring latex, also known as prevulcanized natural rubber, is added to the base as a binder. Preferably, the natural latex will occupy about 10 to 15% of the volume of the resulting mixture.

To this printing composition of base and binder is added one or more naturally occurring pigments obtained from plants or insects. Suitable plants include logwood, brazilwood, sandalwood, fustic, quercitron, acarid resin, indigo root, madder root, tumeric, alkanet, rathania, walnut hulls, annatto seed, Persian berries, safflower, henna and goldenrod. Suitable insects include dried coccus cacti bugs. The pigment or pigments will occupy about 1% of the volume of the composition ready for printing.

In use, the desired ink formulation is applied by conventional screen printing procedures. The printed fabric is air dried and temperatures slightly elevated above room temperature may be employed to accelerate the drying process.

Three examples of my non-polluting and air-dryable screen printing inks are herein set forth:

EXAMPLE ONE

Confederate Grey:
- Pulverize 2.5 g of indigo root powder,
- add 70 ml of water and mix thoroughly,
- heat mixture to 212° F.,
- add to 240 ml of clear base,
- mix in 40 ml of natural latex,
- add 1 g of urea and
- mix at low speed until the urea is dissolved.

The resulting ink is ready for use in printing and, by volume, comprises 84% base, 14.7% natural latex, 0.9% pigment and 0.4% urea.

EXAMPLE TWO

Crimson:
- Pulverize 0.7 g of coccus cacti powder,
- add 240 ml of clear base,
- mix pigment with base slowly to avoid lumps using 1 drop of coconut oil as a wetting agent,
- mix in 25 ml of natural latex,
- add 1 ml of casein and 1 g of urea,
- mix at slow speed until urea is dissolved.

The resulting ink by volume comprises 89% base, 9.3% natural latex, 0.3% pigment, 0.7% casein and 0.7% urea.

EXAMPLE THREE

Sunflower Yellow:
- Pulverize 0.5 g Stil de Grain Lake yellow pigment,
- add to 240 ml of clear base,
- mix pigment with base slowly to avoid lumps using 1 drop of coconut oil as a wetting agent,
- mix in 55 ml of natural latex,
- add 2 g of urea and
- mix at low speed until urea is dissolved.

The resulting ink by volume comprises 79.6% base, 18.2% natural latex, 1.6% pigment and 0.6% urea.

Having particularly described my screen printing inks and given examples of the inks, the scope of my invention is set forth in the following claims.

I claim:

1. A biodegradable screen printing ink composition comprising: a base of water and sodium alginate, a binder of natural latex, and at least one pigment obtained from plants or insects.

2. A biodegradable screen printing ink composition comprising: a base of water and at least one polysaccharide, a binder of natural latex, and a pigment made of natural ingredients, the ink by volume containing from 75 to 90% base, from 8 to 20% natural latex, and from 0.2 to 2.0% natural pigments.

* * * * *